United States Patent
Sawada et al.

(10) Patent No.: US 8,978,959 B2
(45) Date of Patent: Mar. 17, 2015

(54) NI—FE-BASED ALLOY BRAZING FILLER MATERIAL

(75) Inventors: Toshiyuki Sawada, Himeji (JP); Shingo Fukumoto, Himeji (JP); Kotaro Matsu, Tokyo (JP)

(73) Assignees: Sanyo Special Steel Co., Ltd., Hyogo-ken (JP); Tokyo Braze Co., Ltd., Tokyo-To (JP)

( * ) Notice: Subject to any disclaimer, the term of this patent is extended or adjusted under 35 U.S.C. 154(b) by 0 days.

(21) Appl. No.: 13/511,817

(22) PCT Filed: Nov. 26, 2010

(86) PCT No.: PCT/JP2010/071137
§ 371 (c)(1),
(2), (4) Date: Jul. 30, 2012

(87) PCT Pub. No.: WO2011/065486
PCT Pub. Date: Jun. 3, 2011

(65) Prior Publication Data
US 2012/0286025 A1   Nov. 15, 2012

(30) Foreign Application Priority Data

Nov. 26, 2009   (JP) .................. 2009-268696

(51) Int. Cl.
| | |
|---|---|
| *B23K 35/00* | (2006.01) |
| *B23K 35/14* | (2006.01) |
| *B23K 35/30* | (2006.01) |
| *C22C 19/05* | (2006.01) |
| *C22C 38/00* | (2006.01) |
| *C22C 38/18* | (2006.01) |
| *C22C 38/32* | (2006.01) |
| *F28F 21/08* | (2006.01) |

(52) U.S. Cl.
CPC ........... *B23K 35/3033* (2013.01); *B23K 35/304* (2013.01); *B23K 35/3066* (2013.01); *B23K 35/308* (2013.01); *C22C 19/05* (2013.01); *C22C 38/002* (2013.01); *C22C 38/18* (2013.01); *C22C 38/32* (2013.01); *F28F 21/089* (2013.01); *C22C 19/058* (2013.01); *F28F 21/083* (2013.01); *B23K 2201/14* (2013.01); *B23K 2203/04* (2013.01)
USPC ...................................... 228/56.3; 228/262.9

(58) Field of Classification Search
CPC ............ B23K 35/3033; B23K 35/304; B23K 35/3066; B23K 35/308; B23K 2201/14; B23K 2203/04; C22C 19/05; C22C 19/058; C22C 38/022; C22C 38/18; C22C 38/32; F28F 21/083; F28F 21/089
USPC .............................................. 228/56.3, 262.9
See application file for complete search history.

(56) References Cited

U.S. PATENT DOCUMENTS

| | | | | |
|---|---|---|---|---|
| 2,864,693 | A * | 12/1958 | Cape et al. ...................... | 420/36 |
| 7,455,811 | B2 * | 11/2008 | Sjodin ............................. | 420/42 |
| 2004/0056074 | A1 | 3/2004 | Sjodin | |
| 2008/0006676 | A1 * | 1/2008 | Rangaswamy et al. ....... | 228/56.3 |
| 2008/0199718 | A1 * | 8/2008 | Sjodin et al. .................. | 428/594 |
| 2011/0020166 | A1 * | 1/2011 | Otobe et al. ................... | 420/51 |

FOREIGN PATENT DOCUMENTS

| | | |
|---|---|---|
| JP | 9225679 A | 9/1997 |
| JP | 2004512964 A | 4/2004 |
| JP | 200812592 A | 1/2008 |
| JP | 2009148769 A | 7/2009 |
| WO | 2009128174 A1 | 10/2009 |
| WO | WO 2009128174 A1 * | 10/2009 |

* cited by examiner

*Primary Examiner* — Erin Saad
(74) *Attorney, Agent, or Firm* — The Webb Law Firm

(57) ABSTRACT

A Ni—Fe-based alloy brazing filler material is provided comprising, in mass %, Fe: 21 to 40%; Cr: 10 to 30%; P: 7 to 11%; B: 0 to 5%; Si: 0 to 4.5%; V: 0 to 5%; Co: 0 to 5%; Mo: 0 to 5%; the balance being Ni and unavoidable impurities, wherein the mass ratio of Fe to P (Fe/P) is in a range of 2.6 to 5. The present invention provides a Ni—Fe-based alloy brazing filler material having a low melting temperature and a superior corrosion resistance and comprising raw materials that are relatively easily available, for use in manufacture of stainless-steel heat exchangers or the like.

10 Claims, No Drawings

NI—FE-BASED ALLOY BRAZING FILLER MATERIAL

CROSS-REFERENCE TO RELATED APPLICATION

The present application claims priority to Japanese Patent Application No. 2009-268696 filed on Nov. 26, 2009, the entire disclosure of which is incorporated herein by reference.

TECHNICAL FIELD

The present invention relates to a Ni—Fe-based alloy brazing filler material having a low melting temperature and a superior corrosion resistance and comprising raw materials that are relatively easily available, for use in manufacture of stainless-steel heat exchangers or the like.

BACKGROUND ART

Ni-based alloy brazing filler materials superior in corrosion resistance and oxidation resistance have been conventionally used for brazing stainless steel. In particular, BNi-2 (Ni—Cr—Fe—B—Si alloy), BNi-5 (Ni—Cr—Si alloy) and BNi-7 (Ni—Cr—P alloy) defined in JIS Z 3265 (1998) are frequently used. The above three types of Ni-based brazing filler materials respectively has an advantage as well as a disadvantage and is thus used differently depending on application.

For example, BNi-2 has a relatively low liquidus-line temperature of about 1000° C. while its corrosion resistance is not necessarily sufficient. BNi-5 is superior in corrosion resistance while its liquidus-line temperature is about 1140° C., which necessitates a high brazing temperature. In addition, BNi-7 has an extremely low liquidus-line temperature of about 900° C. and a relatively good corrosion resistance, while having to use a Ni—P alloy raw material, which is relatively less available to raise a supply concern, for the purpose of adding phosphorus (P). In this way, since there is no Ni-based brazing filler material having a low liquidus-line temperature and a superior corrosion resistance and comprising a raw material that is relatively easily available, there has been a need for developing a new alloy brazing filler material.

To these problems, there has been proposed, for example in JP09-225679 (Patent Literature 1), a Ni-based heat resistance brazing filler material having a low liquidus-line temperature and a high corrosion resistance. This Ni-based heat resistance brazing filler material is a superior alloy having a low liquidus-line temperature by defining the additive amount of Cr for providing a high corrosion resistance as well as by defining the additive amounts of P and Si that exhibit a eutectic reaction with a Ni—Cr solid solution, while on the other hand necessitating Ni—P that is relatively less available as raw material.

In addition, JP2009-148769A (Patent Literature 2) discloses an alloy that enables a significant reduction in raw material cost by having the base alloy itself composed of Fe and Cr that are very inexpensive instead of Ni that is relatively expensive, while the liquidus-line temperature is 1060° C. or higher as described in its Examples.

CITATION LIST

Patent Literature

[Patent Literature 1] JP09-225679A
[Patent Literature 2] JP2009-148769A

SUMMARY OF THE INVENTION

As mentioned above, the Ni-based brazing filler materials in Patent Literatures 1 and 2 are not those having both of a corrosion resistance and a low melting temperature and comprising raw materials that are easily available.

The inventors has currently aimed at developing a Ni—Fe based alloy brazing filler material which has both of a superior corrosion resistance and a low liquidus-line temperature and comprises raw materials that are relatively easily available, and thus finally developed an alloy in which Fe is added to such an extent that corrosion resistance permits and for which easily available Fe—P can be used as a raw material for P instead of relatively less available Ni—P.

It is thus an object of the present invention to provide a Ni—Fe-based alloy brazing filler material having a low melting temperature and a superior corrosion resistance and comprising raw materials that are relatively easily available, for use in manufacture of stainless-steel heat exchangers or the like.

According to an aspect of the present invention, there is provided a Ni—Fe-based alloy brazing filler material, comprising, in mass %,
Fe: 21 to 40%;
Cr: 10 to 30%;
P: 7 to 11%;
B: 0 to 5%;
Si: 0 to 4.5%;
V: 0 to 5%;
Co: 0 to 5%;
Mo: 0 to 5%;
the balance being Ni and unavoidable impurities, wherein the mass ratio of Fe to P (Fe/P) is in a range of 2.6 to 5.

According to another aspect of the present invention, there is provided a Ni—Fe-based alloy brazing filler material comprising a metal powder comprising the above alloy composition in mixture with a binder.

According to another aspect of the present invention, there is provided a Ni—Fe-based alloy brazing filler material in ribbon form comprising the above alloy composition.

DESCRIPTION OF EMBODIMENTS

The present invention is explained in detail below. It is noted that "%" indicates herein "mass %" unless otherwise defined.

With regard to alloy design of the present invention, first of all, P has been selected as having a particularly low eutectic temperature with Ni among B, Si and P that are incorporated in the aforementioned JIS compositions, in order to lower the liquidus-line temperature. The eutectic composition of Ni—P binary system is Ni-11% P. Nonetheless, it has been considered to use easily available Fe—P as a raw material for adding P, instead of relatively less available Ni—P.

In the meantime, the P content in the commercially available Fe—P raw material is about 25%, the balance of 75% being Fe and impurities. Thus, Fe in an amount about three times as large as P is to be added at the same time. It has also been considered that addition of Cr is essential for improving corrosion resistance. In view of the above, it has been considered that a P amount of about 11%, an Fe amount about three times as large as P, and a Cr amount for ensuring sufficient corrosion resistance provide an approximate system of essential elements. Furthermore, through a study as shown in Examples, ranges of the additive amounts of these essential elements and minor additive elements as well as other conditions have been determined to reach the present invention.

Fe is an essential element which is accompanied by using an Fe—P raw material, and is contained in the alloy in an amount of 21 to 40%, preferably 22 to 35%, more preferably 22 to 29%. Fe can reduce raw material cost by reducing the content of Ni which is the base metal, but an increasing amount of Fe leads to an increase in the liquidus-line temperature. However, Fe can be added positively in an amount up to 21% because Fe in this amount can reduce the Ni content almost without raising the liquidus-line temperature. On the other hand, addition of Fe in an amount of more than 40% results in a significant increase in the liquidus-line temperature.

Cr is an essential element for improving corrosion resistance, and is contained in the alloy in an amount of 10 to 30%, preferably 14 to 28%, more preferably 17 to 24%. While an increasing amount of Cr leads to an increase in the liquidus-line temperature, an additive amount of less than 10% results in insufficient improvement in corrosion resistance, an additive amount of more than 30% resulting in an excessive increase in the liquidus-line temperature.

P is an essential element for lowering the liquidus-temperature, and is contained in the alloy in an amount of 7 to 11%, preferably 7.5 to 10.5%, more preferably 8.5 to 10%. While excessive addition of P in an amount beyond an eutectic composition leads to an increase in the liquidus-line temperature, an additive amount of less than 7% or more than 11% results in a high liquidus-line temperature.

The alloy according to the present invention uses an easily available Fe—P raw material that comprises about 25% of P as a raw material, with the mass ratio Fe/P in the alloy being 2.6 to 5, preferably 2.6 to 4.0, more preferably 2.6 to 3.2. P content of 25% leads to Fe/P=75/25=3.0. Since P content in this raw material varies to some extent, the lower limit of Fe/P is made 2.6. However, a mass ratio Fe/P of less than 2.6 results in a too small amount of Fe compared to that of P, necessitating addition of P by using relatively less available Ni—P other than the Fe—P raw material. In addition, a mass ratio Fe/P of more than 5 results in unbalance between the Fe amount contributing to an increase in the liquidus-line temperature and the P amount contributing to a decrease in the liquidus-line temperature, leading to an excessive increase in the liquidus-line temperature of the alloy.

B and Si may be added as needed as an optional element since these elements have an effect of decreasing the liquidus-line temperature although such effect is not as well as that of P. In this case, 5% or less of B and 4.5% or less of Si may be contained in the alloy so that the total amount of P+B+Si may be 7 to 13%. Addition of more than 5% of B or more than 4.5% of Si results in an increase in liquidus-line temperature. A total amount of P+B+Si of more than 13% also results in an increase in liquidus-line temperature. Since B and Si are not essential elements, the lower limit of the total amount of P+B+Si is 7% similarly to that of the P amount, while less than 7% results in an increase in liquidus-line temperature. Preferable B amount is 3.5% or less, more preferably 2.5% or less. Preferable Si amount is 3.5% or less, more preferably 2.5% or less. Preferable total amount of P+B+Si is 7.5 to 11.5%, more preferably 8.5 to 10%.

V, Co and Mo are optional elements that have an effect of improving strength, respectively. 5% or less of V, 5% or less of Co and 5% or less of Mo may be contained in the alloy so that the total amount of V+Co+Mo may be 10% or less. In the alloy according to the present invention, addition of at least one element of V, Co and Mo in an amount of more than 5% or the total amount of V+Co+Mo of more than 10% results in an increase in liquidus-line temperature. Preferable amount of each of V, Co and Mo is 1% or less, while no addition of these elements is more preferred. In addition, preferable total amount of V+Co+Mo is 5% or less, more preferably 0%.

The alloy according to the present invention does not contain active elements, such as Ti, that can be easily oxidized, and thus can also be used as a paste in mixture with a normal binder as conventionally used. The alloy according to the present invention can also be used as a normal quenched ribbon or rolled ribbon as conventionally used.

EXAMPLES

The present invention is explained in detail below with reference to examples.

Example 1

Mesurement of Liquidus-Line Temperature, Brazing Test, and Corrosion Resistance Test A quenched ribbon was prepared having a composition shown in Table 1 and then subjected to a liquidus-line temperature measurement and a brazing test. The quenched ribbon was obtained by previously weighing out raw materials to constitute each composition shown in Table 1 followed by ark melting to prepare about 50 g of a matrix material; placing this matrix material into a quartz tube with a nozzle width of 25 mm to remelt this matrix material; and tapping this molten material onto a copper roll with a diameter of 300 mm being rotated at 1500 rpm. The melting and tapping were conducted in Ar atmosphere under a reduced pressure. This quenched ribbon was subjected to thermal analysis to measure the liquidus-line temperature. The quenched ribbon thus obtained was placed on a disk made of SUS304 with a thickness of 1 mm and a diameter of 20 mm and subjected to brazing in vacuum at 1100° C., followed by cross-section observation with an optical microscope for evaluation in accordance with the following criteria:

A: Quenched ribbon was fully melted and brazed.
B: There remains a portion that was unmelted.

Evaluation on melting was performed by assessing whether the entire portion of the brazing material became a dendrite-like solidified structure. This brazed test piece prepared in the same way was used and subjected to a salt spray test in which the test piece was exposed to a 5% NaCl solution at 35° C. for 96 hours. The exposed surface was observed and evaluated in accordance with the following criteria:

AA: No rust generated
A: Rust generated on part of the surface
B: Rust generated over the entire surface Example 2

Bending Resistance Test

An ingot having a composition shown in Table 1 was prepared by centrifugal casting. The size of the prepared ingot was such that the diameter was about 35 mm and the length was about 30 mm. A test piece was cut out of the ingot to the size of 1.8 mm square and a length of 20 mm, followed by a three-point bending test with a supporting-point distance of 10 mm. Measured bending strength was evaluated in the following criteria.

B: Bending strength was less than 500 MPa
A: Bending strength was 500 MPa or more and less than 1000 MPa
AA: Bending strength was 1000 MPa or more

TABLE 1

| No | Fe | Cr | P | B | Si | V | Co | Mo | Ni | Fe/P | P + B + Si | V + Co + Mo | Remarks |
|---|---|---|---|---|---|---|---|---|---|---|---|---|---|
| 1 | 21 | 10 | 8.1 | 0 | 0 | 0 | 0 | 0 | balance | 2.6 | 8.1 | 0 | Present |
| 2 | 25 | 17 | 9.3 | 0 | 0 | 0 | 0 | 0 | balance | 2.7 | 9.3 | 0 | Invention |
| 3 | 27 | 20 | 9.0 | 0 | 0 | 0 | 0 | 0 | balance | 3.0 | 9.0 | 0 | Examples |
| 4 | 29 | 24 | 9.1 | 0 | 0 | 0 | 0 | 0 | balance | 3.2 | 9.1 | 0 | |
| 5 | 35 | 28 | 8.8 | 0 | 0 | 0 | 0 | 0 | balance | 4.0 | 8.8 | 0 | |
| 6 | 40 | 30 | 8.0 | 0.5 | 0.5 | 0 | 0 | 0 | balance | 5.0 | 9.0 | 0 | |
| 7 | 29 | 24 | 7.0 | 2.5 | 0 | 0 | 0 | 0 | balance | 4.1 | 9.5 | 0 | |
| 8 | 29 | 24 | 10.0 | 0 | 2.5 | 0 | 0 | 0 | balance | 2.9 | 12.5 | 0 | |
| 9 | 29 | 24 | 11.0 | 0 | 0 | 0.5 | 0 | 0 | balance | 2.6 | 11.0 | 0.5 | |
| 10 | 29 | 24 | 7.0 | 0 | 0 | 0 | 5 | 5 | balance | 4.1 | 7.0 | 10 | |
| 11 | <u>20</u> | 10 | 7.5 | 0 | 0 | 0 | 0 | <u>6</u> | balance | 2.7 | 7.5 | 6 | Comparative |
| 12 | <u>45</u> | 30 | 9.0 | 0.5 | 0.5 | 5 | <u>6</u> | 0 | balance | 5.0 | 10.0 | <u>11</u> | Examples |
| 13 | 21 | <u>8</u> | 8.1 | 0 | 0 | 0 | 0 | 0 | balance | 2.6 | 8.1 | 0 | |
| 14 | 40 | <u>35</u> | 8.0 | 0.5 | 0.5 | 0 | 0 | 0 | balance | 5.0 | 9.0 | 0 | |
| 15 | 15 | 24 | <u>6.0</u> | 0 | 0 | 0 | 0 | 0 | balance | <u>2.5</u> | <u>6.0</u> | 0 | |
| 16 | 36 | 24 | <u>12.0</u> | 2.5 | 0 | 0 | 0 | 0 | balance | 3.0 | <u>14.5</u> | 0 | |
| 17 | 40 | 30 | 7.3 | <u>6</u> | 0 | 0 | 0 | 0 | balance | <u>5.5</u> | <u>13.3</u> | 0 | |
| 18 | 29 | 24 | 8.0 | 0 | <u>6</u> | 0 | 0 | 0 | balance | 3.6 | <u>14.0</u> | 0 | |
| 19 | 20 | 10 | 8.1 | 0 | 0 | 0 | 0 | 0 | balance | <u>2.5</u> | 8.1 | 0 | |

Note:
Underlined figures are outside the conditions as required in the present invention.

TABLE 2

| No. | Liquidus-line temerature (° C.) | Brazability | Corrosion Resistance | Bending Resistance | Remarks |
|---|---|---|---|---|---|
| 1 | 930 | A | A | A | Present |
| 2 | 970 | A | A | A | Invention |
| 3 | 990 | A | A | A | Examples |
| 4 | 1010 | A | A | A | |
| 5 | 1040 | A | AA | A | |
| 6 | 1050 | A | AA | A | |
| 7 | 1000 | A | A | A | |
| 8 | 1000 | A | A | A | |
| 9 | 1050 | A | A | AA | |
| 10 | 1060 | A | AA | AA | |
| 11 | 1090 | B | A | AA | Comp. |
| 12 | 1120 | B | B | AA | Examples |
| 13 | 920 | A | B | A | |
| 14 | 1080 | B | A | A | |
| 15 | 1080 | B | B | A | |
| 16 | 1090 | B | A | B | |
| 17 | 1100 | B | B | A | |
| 18 | 1090 | B | B | B | |
| 19 | 930 | A | A | A | |

As shown in Tables 1 and 2, Nos. 1 to 10 are present invention examples, while Nos. 11 to 19 are comparative examples.

Comparative Example No. 11 had to use relatively less available Ni—P as a raw material for P and was inferior in brazability, due to the low Fe content and the high Mo content. Comparative Example No. 12 was inferior in brazability and corrosion resistance due to the high Fe content and the high V+Co+Mo content. Comparative Example No. 13 was inferior in corrosion resistance due to the low Cr content. Comparative Example No. 14 was inferior in brazability due to the high Cr content. Comparative Example No. 15 was inferior in brazability and corrosion resistance due to the low P content and the low Fe/P mass ratio. Comparative Example No. 16 was inferior in brazability and had a bending strength of less than 500 MPa, due to the high P content.

Comparative Example No. 17 was inferior in brazability and corrosion resistance due to the high B content and the high Fe/P mass ratio. Comparative Example No. 18 was inferior in brazability and poor in corrosion resistance and had a bending strength of less than 500 MPa, due to the high Si content. Comparative Example No. 19 was satisfactory in brazability, corrosion resistance and bending strength, but had to use relatively less available Ni—P as a raw material, due to the low Fe content and the low Fe/P mass ratio. In contrast, it can be understood that Example Nos. 1 to 10 satisfy the conditions of the present invention and thus are superior in the above characteristics.

As described above, by selecting P, which has a particularly low eutectic temperature with Ni among B, Si and P, in order to lower the liquidus-line temperature and also by using relatively easily available Fe—P as the raw material for adding P, it is possible to provide a Ni—Fe-based alloy brazing filler material which is inexpensive in raw material cost due to the reduction in the base metal Ni content, retaining corrosion resistance and having brazability and bending strength.

The invention claimed is:

1. A Ni—Fe-based alloy brazing filler material, comprising, in mass %,
   Fe: 21 to 40%;
   Cr: 14 to 30%;
   P: 7 to 11%;
   B: 0 to 5%;
   Si: 0 to 4.5%;
   V: 0 to 5%;
   Co: 0 to 5%;
   Mo: 0 to 5%;
   the balance being at least 37% Ni and unavoidable impurities, wherein the mass ratio of Fe to P (Fe/P) is in a range of 2.6 to 4.1.

2. The Ni—Fe-based alloy brazing filler material according to claim 1, comprising one or two of:
   B: more than 0% and not more than 5%; and
   Si: more than 0% and not more than 4.5%, wherein the total amount of P+B+Si is in a range of 7 to 13%.

3. The Ni—Fe-based alloy brazing filler material according to claim 1, comprising one or more of:
   V: more than 0% and not more than 5%;
   Co: more than 0% and not more than 5%; and
   Mo: more than 0% and not more than 5%, wherein the total amount of V+Co+Mo is in a range of 10% or less.

4. The Ni—Fe-based alloy brazing filler material according to claim 2, comprising one or more of:

V: more than 0% and not more than 5%;
Co: more than 0% and not more than 5%; and
Mo: more than 0% and not more than 5%, wherein the total amount of V+Co+Mo is in a range of 10% or less.

5. The Ni—Fe-based alloy brazing filler material comprising a metal powder comprising the alloy composition according to claim 1 in mixture with a binder.

6. The Ni—Fe-based alloy brazing filler material in ribbon form comprising the alloy composition according to claim 1.

7. The Ni—Fe-based alloy brazing filler material according to claim 1, comprising, in mass %, Fe: 21 to 29%.

8. The Ni—Fe-based alloy brazing filler material according to claim 1, comprising, in mass %, Cr: 17 to 30%.

9. The Ni—Fe-based alloy brazing filler material according to claim 1, having a liquid-line temperature of 1050° C. or less.

10. A Ni—Fe-based alloy brazing filler material, comprising, in
mass %,
Fe: 21 to 40%;
Cr: 17 to 30%;
P: 7 to 11%;
B: 0 to 5%;
Si: 0 to 4.5%;
V: 0 to 5%;
Co: 0 to 5%;
Mo: 0 to 5%;
the balance being at least 35% Ni and unavoidable impurities, wherein the mass ratio of Fe to P (Fe/P) is in a range of 2.6 to 4.1, and wherein the Ni—Fe-based alloy brazing filler material comprises, in mass %, at least 51% of a combination of Ni and Cr.

* * * * *